(12) United States Patent
Goncalves et al.

(10) Patent No.: US 10,929,805 B2
(45) Date of Patent: Feb. 23, 2021

(54) ADJUSTING SIMULATION TIMES FOR COST SIMULATION ANALYSIS OF TRANSPORTATION LANE PROPOSALS BASED ON SPACE AND TIME GRANULARITIES

(71) Applicant: INTERNATIONAL BUSINESS MACHINES CORPORATION, Armonk, NY (US)

(72) Inventors: Joao Goncalves, Wappinger Falls, NY (US); Parijat Dube, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 156 days.

(21) Appl. No.: 16/052,560

(22) Filed: Aug. 1, 2018

(65) Prior Publication Data
US 2020/0042938 A1    Feb. 6, 2020

(51) Int. Cl.
*G06Q 10/08*    (2012.01)
*G06Q 10/06*    (2012.01)
*G06Q 30/06*    (2012.01)

(52) U.S. Cl.
CPC ..... *G06Q 10/08345* (2013.01); *G06Q 10/067* (2013.01); *G06Q 10/08355* (2013.01); *G06Q 30/0611* (2013.01)

(58) Field of Classification Search
CPC ........... G06Q 30/0611; G06Q 10/0834; G06Q 30/08; G06Q 10/08345; G06Q 30/067
See application file for complete search history.

(56) References Cited

U.S. PATENT DOCUMENTS 6,035,289 A * 3/2000 Chou ............... G06Q 30/08
                                                     705/35
6,064,981 A * 5/2000 Barni .............. G06Q 10/08
                                                     705/26.3
(Continued)

FOREIGN PATENT DOCUMENTS

WO    2008/027895 A2    3/2008
WO    2008/042196 A1    4/2008

OTHER PUBLICATIONS

Song, Jiongjong et al., Optimization Models for Auctions for Transportation Service Contract Procurement Institute of Transportation Studies, University of California, Irvine, Jul. 2004 (Year: 2004).*

(Continued)

*Primary Examiner* — Scott L Jarrett
(74) *Attorney, Agent, or Firm* — Intelletek Law Group, PLLC; Gabriel Daniel, Esq.

(57) ABSTRACT

A method and system of simulating a cost of shipment are provided. A request for quote (RFQ) is received by a computing device from a shipper having a plurality of trade lanes. A revenue generated from each trade lane is estimated and ranked based on the estimated revenue. An original time limit is assigned to each trade lane. A trade lane with a highest ranking that has not yet been selected is selected. For the selected trade lane, graphs for space and time granularity analysis are generated. Space and time granularities that maximize accuracy within the assigned time limit based on the generated graphs are calculated. Cost simulation analysis is performed using the calculated space and time granularities. Upon determining that there are trade lanes not yet selected, there is a return to the act of selecting a trade lane.

18 Claims, 8 Drawing Sheets

(56) References Cited

U.S. PATENT DOCUMENTS

| | | | |
|---|---|---|---|
| 7,272,568 B1* | 9/2007 | Birch | G06Q 10/02 705/5 |
| 7,343,300 B2 | 3/2008 | Podgurny | |
| 7,680,674 B2 | 3/2010 | Podgurny | |
| 7,698,204 B2* | 4/2010 | Abendroth | G06Q 10/02 705/37 |
| 7,792,762 B2 | 9/2010 | Podgurny | |
| 7,814,028 B2 | 10/2010 | Podgurny | |
| 8,396,739 B2 | 3/2013 | Bassey | |
| 9,082,144 B2 | 7/2015 | Jones et al. | |
| 9,336,507 B2 | 5/2016 | Podgurny et al. | |
| 9,898,767 B2 | 2/2018 | Psota et al. | |
| 2001/0037281 A1* | 11/2001 | French | G06Q 40/04 705/37 |
| 2001/0047284 A1* | 11/2001 | Blalock | G06Q 40/04 705/26.1 |
| 2002/0184042 A1* | 12/2002 | Hommrich | G06Q 10/08355 705/37 |
| 2003/0014288 A1* | 1/2003 | Clarke | G06Q 10/06316 705/7.26 |
| 2003/0046133 A1* | 3/2003 | Morley | G06Q 10/0639 705/7.12 |
| 2003/0088494 A1 | 5/2003 | Lee | |
| 2003/0163333 A1* | 8/2003 | Podgurny | G06Q 10/08 705/335 |
| 2003/0171940 A1* | 9/2003 | Podgurny | G06Q 10/083 705/335 |
| 2005/0055299 A1* | 3/2005 | Chambers | G06Q 40/04 705/36 R |
| 2005/0060244 A1* | 3/2005 | Goolkasian | G06Q 30/0613 705/28 |
| 2009/0037095 A1* | 2/2009 | Jani | G06Q 10/0834 701/533 |
| 2009/0171736 A1* | 7/2009 | Segler | G06Q 10/00 705/28 |
| 2013/0030958 A1* | 1/2013 | Michalski | G06Q 10/0838 705/26.81 |
| 2013/0173412 A1* | 7/2013 | Motley | G06Q 30/00 705/26.4 |
| 2013/0317929 A1* | 11/2013 | Schnorf | G06Q 10/08 705/26.3 |
| 2014/0149313 A1 | 5/2014 | Laurent et al. | |
| 2014/0317014 A1 | 10/2014 | Langhorne, III et al. | |
| 2014/0324633 A1 | 10/2014 | Pollak et al. | |
| 2015/0120600 A1 | 4/2015 | Luwang et al. | |
| 2015/0161697 A1* | 6/2015 | Jones | G06Q 30/0611 705/26.4 |
| 2015/0161698 A1* | 6/2015 | Jones | G06Q 10/0835 705/26.4 |
| 2016/0032160 A1 | 2/2016 | Koh et al. | |
| 2016/0110807 A1 | 4/2016 | Downes | |
| 2016/0189102 A1* | 6/2016 | Schreiber | G06Q 10/08355 705/338 |
| 2016/0321609 A1* | 11/2016 | Dube | G06Q 10/08355 |
| 2017/0228846 A1 | 8/2017 | Mohr et al. | |
| 2017/0344944 A1 | 11/2017 | Yao et al. | |
| 2018/0068269 A1* | 3/2018 | Pillai | G06Q 10/08345 |
| 2018/0349849 A1* | 12/2018 | Jones | G06Q 10/0833 |

OTHER PUBLICATIONS

PeopleSoft Enterprise Strategic Sourcing 9.1—PeopleBook Oracle, Nov. 2009 (Year: 2009).*

Oracle Sourcing Supplier Guide Ameren, May 1, 2007 (Year: 2007).*

Song, J., "Approximation Algorithms for the bid Construction Problem in Combinatorial Auctions for the Procurement of Freight Transportation Contracts"; Science Direct, Transportation Research Part B 39 (2005); pp. 914-933.

* cited by examiner

Possible Allocation of TEUs

| Combination K | Low | Medium | High | $p_k$ | $c_k$ |
|---|---|---|---|---|---|
| 1 | 300 | 0 | 0 | | |
| 2 | 0 | 300 | 0 | | |
| 3 | 0 | 0 | 300 | | |
| 4 | 200 | 100 | 0 | | |
| 5 | 200 | 0 | 100 | | |
| 6 | 100 | 200 | 0 | | |
| 7 | 0 | 200 | 100 | | |
| 8 | 100 | 0 | 200 | | |
| 9 | 0 | 100 | 200 | | |
| 10 | 100 | 100 | 100 | | |

Possible Allocation of TEUs for Different Carriers

| Carriers (i) | $m_i$ (%) | Period j | | |
|---|---|---|---|---|
| | | Low | Medium | High |
| A | 30 | 0 | 0 | 0 |
| B | 30 | 30 | 60 | 0 |
| C | 50 | 50 | 100 | 0 |
| D | 60 | 20 | 40 | 0 |

ADJUSTING SIMULATION TIMES FOR COST SIMULATION ANALYSIS OF TRANSPORTATION LANE PROPOSALS BASED ON SPACE AND TIME GRANULARITIES

BACKGROUND

Technical Field

The present disclosure generally relates to aggregation of data, and more particularly, to tools that efficiently calculate transportation cost, over a computer network.

Description of the Related Art

Over the years, the freight industry has evolved to several salient participants, (i) a carrier who operates the transportation equipment, (ii) a shipper, sometimes referred to herein as the customer, who is the producer of the goods to be shipped (typically a large manufacturing company or retailer), (iii) and a middle man, sometimes referred to herein as a forwarder, who aggregates products from shippers to more efficiently employ the capacity offered by the carriers between an origin and a destination.

Today, shipment between any two destinations may involve multiple transportation modes and different possible routes. The decision regarding which one or more modes and routes to use for each shipment of goods can be complicated, involving factors such as time constraints, the availability of shipping capacity from the carriers, reliability of service, cost, and other factors. Analyzing the multiple factors can be time consuming and challenging in the context of responding to a Request for Quotation (RFQ). As used herein, an RFQ is a type of reverse auction where a request is submitted by a shipper to invite potential forwarders to bid on a cost for transporting their products from one or more origins to one or more destinations.

SUMMARY

According to various exemplary embodiments, a computing device, a non-transitory computer readable storage medium, and a method are provided to simulate a cost of shipment. A request for quote (RFQ) is received from a shipper having a plurality of trade lanes. A revenue generated from each trade lane is estimated. Each trade lane is ranked based on the estimated revenue generated. An original time limit is assigned to each trade lane. A trade lane with a highest ranking that has not yet been selected is selected. For the selected trade lane, graphs for space and time granularity analysis are generated. Space and time granularities that maximize accuracy within the assigned time limit based on the generated graphs are calculated. A cost simulation analysis is performed using the calculated space and time granularities. Upon determining that there are trade lanes not yet selected, the process returns to the act of selecting a trade lane.

In one embodiment, upon determining that there are trade lanes not yet selected and before returning to the act of selecting a trade lane a remaining available time is calculated. Upon determining that a sum of time limits of trade lanes not yet selected, of the plurality of trade lanes, is not within the remaining available time, a new time limit is assigned to each trade lane not yet selected.

In one embodiment, the assigned original time limit is progressively less for each lower ranked trade lane.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to the efficient simulation of prospective transportation cost using a computer network, to facilitate an accurate and timely response to an RFQ. Today, the decision regarding the most effective one or more modes and routes to use for each shipment of goods to accommodate predetermined business rules (e.g., lowest cost, shortest time, and/or least risk), may involve many factors that may be time consuming for a computing device to evaluate within the time frame provided in an RFQ.

For shippers, a concern may be the ability to ship goods from various origins to one or more destinations in a timely manner. Some shippers may not tolerate capacity starvation, which is a condition characterized by an insufficient capacity to ship the goods in a timely manner. To minimize such risks, a shipper can enter into long-term contracts with forwarders to ensure that the capacity is guaranteed for certain shipments at future dates. To that end, the shippers send out RFQs to one or more forwarders to solicit bids therefrom.

However, shippers typically do not provide a breakdown of demand. Even if there were such breakdown, calculating the most efficient form of transportation in terms of carrier(s) and routes for RFQs involving a large volume of cargo (sometimes measured in twenty-foot equivalent units (TEUs)), is time consuming and computationally complex for a computing device to accommodate for a given turn-around time, which may lead to lost opportunities. In the absence of an accurate spread of demand, a forwarder may provide a quote for the aggregate demand that is more conservative (e.g., skewed to a more pessimistic cost scenario). In this way, delays are mitigated and the probability of losing money on a long-term contract is reduced. However, the higher cost estimate provided in response to an RFQ may ultimately lead to the shipper not accepting the RFQ, leading to a loss of business to the forwarder.

Accordingly, what is provided herein is a method and system, performed by an appropriately configured computing device, to provide an accurate and time efficient simulation in response to an RFQ for long-term contracts. To that end, each trade lane in an RFQ is ranked based on an estimated revenue generated from the trade lane.

As used herein, space granularity, sometimes referred to herein as a granularity of shipment, is the increment of TEUs that are considered possible to be shipped in each time period for the purpose of computing the transportation cost. So, if the space granularity is 100 TEUs, for the purpose of computing the transportation cost, it can be assumed that shipments that are in increments of 100 TEUs are used, such as 100 TEUs, 200 TEUs (100+100), 300 TEUs (100+100+100), and the like.

As used herein, time granularity relates to the number of time periods that a trade lane is divided into for the purpose of computing the transportation cost. For example, within a year, if the time granularity is three periods, the one-year timeframe is divided into three separate periods. These periods need not be equally spaced. For example, there may be a period of three months (e.g., "Low" period), a second period of seven months (e.g., "Medium" period), and a third period of two months (e.g., "High" period).

Based on the granularity of shipment and on the time granularity, optimization is performed to identify carrier allocation for each trade lane. By virtue of the architecture described herein, the simulations performed by the appropriately configured computing device are simplified and streamlined, thereby improving the computational efficiency of the computing device, while providing a more accurate simulation of the prospective cost in a predetermined time period. The techniques described herein may be implemented in a number of ways. Example implementations are provided below with reference to the following figures.

Figure 1:
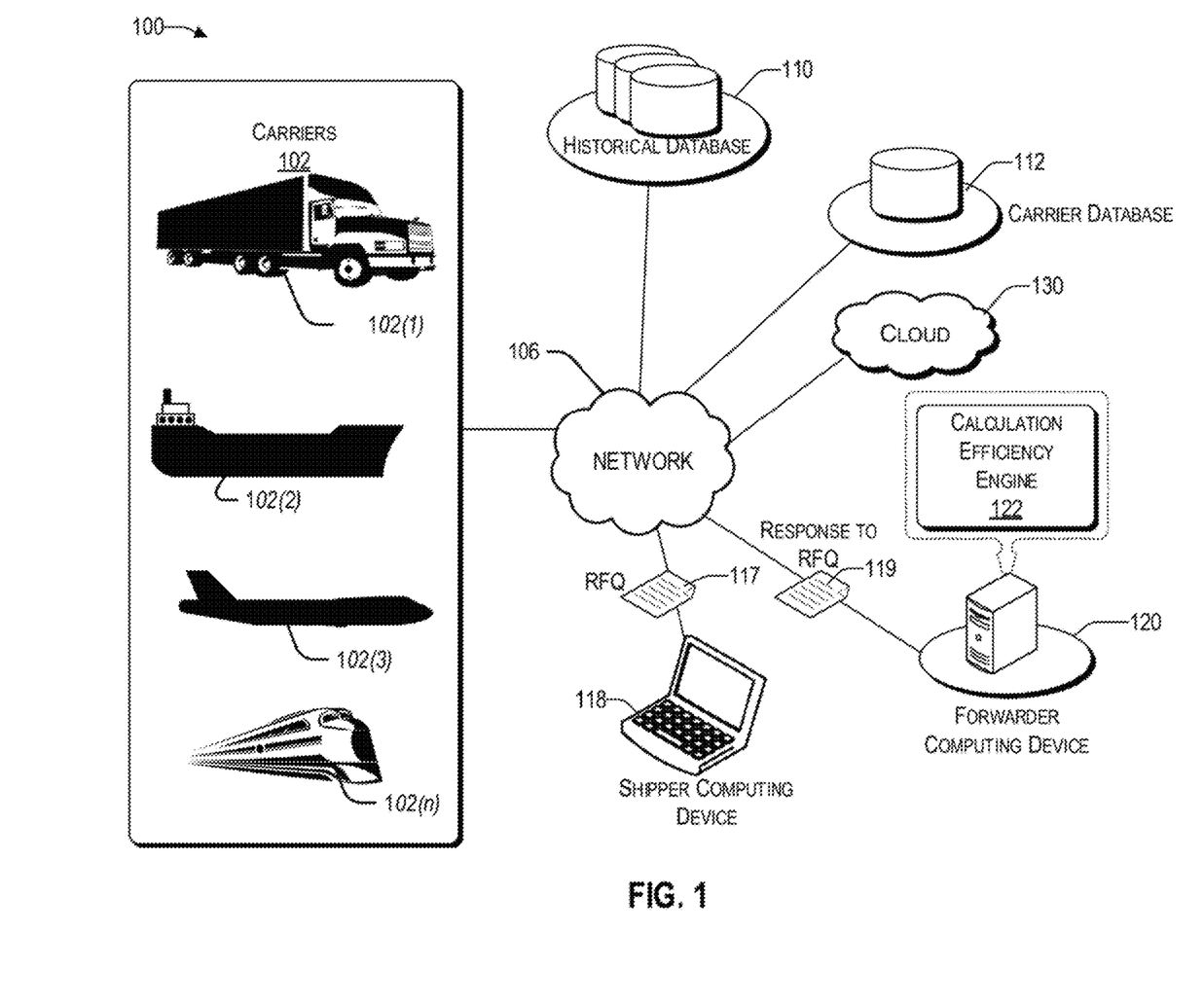
FIG. 1 illustrates an example architecture for implementing a system that simulates shipping cost for different trade lanes.

FIG. 1 illustrates an example architecture 100 for implementing a system that simulates shipping cost of different trade lanes in the context of an RFQ. Shipment between any origin and destination, sometimes referred to herein as a trade lane, may involve multiple transportation modes and multiple possible routes, represented herein by carriers 102. Different modes of transportation may include, without limitation, trucks 102(1), cargo ships 102(2), airplanes 102 (3), trains 102(4), and the like.

There is a shipper having a computing device 118, who would like to transport products on different trade lanes. To that end, the shipper sends out an RFQ 117 to one or more forwarders having a computing device, similar to the forwarder computing device 120. The forwarder computing device 120 has a calculation efficiency engine 122 that is operative to perform calculations that balance time efficiency with accuracy, such that a response to an RFQ 119 can be accurately calculated within an allocated time. The calculation efficiency engine 122 is discussed in more detail later.

Architecture 100 includes a network 106 that allows various computing devices and databases to be accessed by the calculation efficiency engine 122. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, which provides various ancillary services, such as communication with various databases, such as the historical database 110, carrier database 112, shipper computing device, carriers 102, and the Internet. To facilitate the present discussion, network 106 will be described, by way of example only and not by way of limitation, as a mobile network as may be operated by or service provider to provide a wide range of mobile communication services and supplemental services or features to its subscriber customers and associated mobile device users.

The historical database 110 can be used by the calculation efficiency engine 122 to retrieve historical data therefrom, such as prior quotes provided to the same shipper or other similarly situated shippers, past realized demands, transportation hotspots, revenue sensitivity, etc. There may be a carrier database 112 that can be used by the calculation efficiency engine 122 to retrieve transportation cost, available discounts, available volume commitments, route capacity, past engagement, reliability information, and the like. In one embodiment, each carrier 102(1) to 102(n) has its own carrier database, represented collectively by carrier database 112.

The request for an RFQ 117 from the shipper computing device 118 typically includes one or more origins and corresponding destinations (i.e., trade lanes) and a time limit (i.e., response time) for the response to an RFQ 119. In some scenarios, the RFQ may include various preferences and/or limitations, such as preferred routes, delivery deadlines, refrigeration requirements, risk factors, etc., sometimes referred to herein as business rules. In various embodiments, the RFQ itself or the historical database 110 can be a source of the business rules 110.

Upon receiving the RFQ 117, the calculation efficiency engine 122 estimates a revenue generated from each trade lane. For example, the revenue generated may be based on a combination of a number of TEUs associated with the trade lane and distance traveled for the trade lane. It will be understood that some trade lanes may be more expensive than others, even if the number of TEUs is smaller and/or the distance is shorter. That is because some deliveries may involve one or more modes of transportation that are costlier than others. These preliminary calculations are based on crude estimates that do not involve substantial computing processing resources.

The calculation efficiency engine 122 ranks each trade lane based on the revenue generated. Trade lanes that are more lucrative (i.e., generate more revenue to the forwarder) are ranked higher than those that generate comparatively less.

The calculation efficiency engine 122 is configured to perform a space and time granularity analysis for the different trade lanes. To that end, the calculation efficiency engine 122 determines the available computing resources. In various embodiments, the computing resources may be that of the forwarder computing device 120, the cloud 130, or a combination thereof. Computing resources may include, without limitation, the number of processors, the clock frequency of operation, memory resources, etc. The calculation efficiency engine 122 estimates accuracy versus space and time granularities. Further, based on the available computing resources, the calculation efficiency engine 122 also determines the simulation time based on space and time granularities. An example analysis is discussed later in the context of FIG. 4A and FIG. 4B.

The calculation efficiency engine 122 analyzes a cost for each trade lane based on its ranking. Trade lanes that have highest ranking (i.e., trade lanes that contribute most to the revenue) may be analyzed first, based on an appropriate space and time granularities for that trade lane. As will be discussed in more detail in the context of FIG. 4A and FIG. 4B, the higher the granularity of shipment, the higher the accuracy in the calculation of the transportation cost, but the more computationally resource intensive the calculation will be, ultimately adversely affecting the length in response time for the RFQ. Trade lanes that have highest ranking are given a higher time limit for the cost simulation which will lead to granularity of shipment and time granularity that will produce a higher accuracy than other trade lanes. Different combinations of granularities of shipment and time granularities for different trade lanes are discussed in detail in the context of FIG. 4A and FIG. 4B. Consequently, the calculation efficiency engine 122 can provide a timely RFQ that is of high precision, in view of the computing resources available.

While the historical database 110, the carrier database 112 and the forwarder computing device 120 have been illustrated by way of example to be on different platforms, it will be understood that in various embodiments, their functionality described herein can be combined. In other embodiments, these computing platforms may be implemented by virtual computing devices in the form of virtual machines or software containers that are hosted in a cloud 130, thereby providing an elastic architecture for processing and storage. In the context of cloud computing, the computing resources are based on prior agreement.

Figure 2:
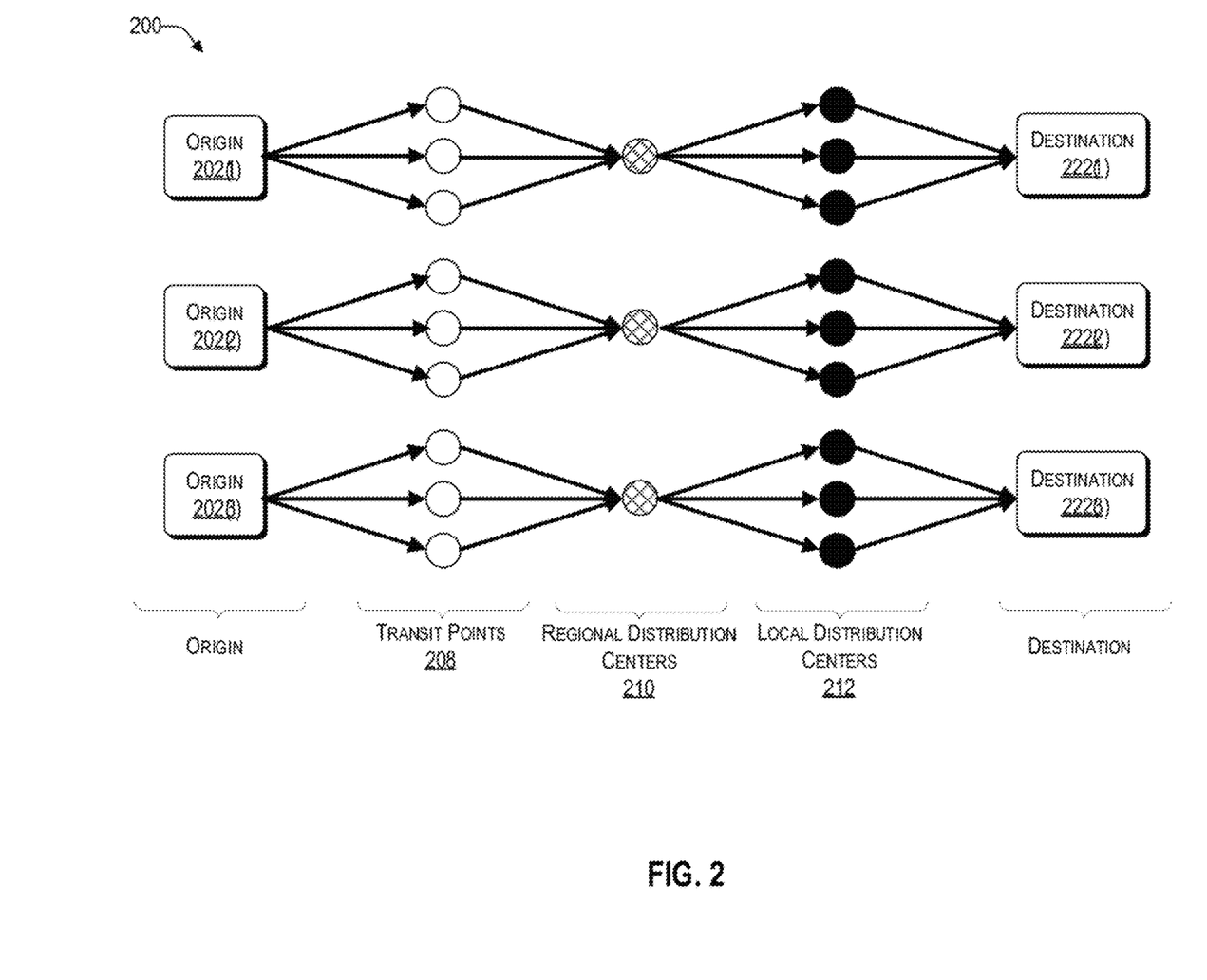
FIG. 2 is a conceptual block diagram of parameters considered by the calculation efficiency engine of FIG. 1, for each trade lane.

Reference now is made to FIG. 2, which is a conceptual block diagram of parameters considered by the calculation efficiency engine 122 of FIG. 1, for each trade lane. Aspects of the block diagram 210 are discussed with reference to the architecture 100 of FIG. 1. Each origin-destination combination, represented by origins 202(1) to 202(3) and destinations 222(1) to 222(3), is a separate trade lane associated with the shipper. For example, in the first trade lane, the origin 202(1) may be Shanghai, China, and its corresponding destination 222(1) may be New York. Each trade lane may include, without limitation, different transit points 208, regional distribution centers 210, and local distribution centers 212.

There are many factors to consider as to how to price complex end to end deliveries for the calculation efficiency engine 122. For example, the calculation efficiency engine 122 may determine how to split freight between available modes of transportation and by what ratio. The calculation efficiency engine 122 may determine additional parameters, such as where intermodal operations should be carried out and hubs be placed (e.g., such as transit points 208, regional distribution centers 210, local distribution centers 212); and potential delays and travel times associated with each mode of transportation (e.g., truck, cargo ship, airplane, etc.).

In one embodiment, the calculation efficiency engine 122 may determine schedules to prevent intermodal delay propagation. To that end, the calculation efficiency engine 122 may refer to the historical database 110 to identify prior patterns therefrom and/or retrieve schedules from the carrier database 112. The calculation efficiency engine 122 may also consider how to utilize existing transportation capacity. For example, there may be existing service level agreements (SLAs) with carriers that may not have been exhausted, which may provide a more cost-effective way of transporting the products.

A complex multimodal simulation may be computing resource intensive when all trade lanes are simulated, and thus very time consuming, which may lead to not accommodating the deadline for the RFQ for a desired accuracy. Based on the teachings herein, each trade lane is ranked and simulated based on its ranking, thereby improving the computing technology by virtue of simplifying the calculations to be performed. Instead of the calculation efficiency engine 122 performing the simulation of each trade lane with equal computational resources, trade lanes that are in different rank categories are simulated with different granularity of shipment and time granularity, thereby conserving computational resources. Accordingly, the calculation efficiency engine 122 is configured to balance the trade-offs between accuracy of the cost estimation and the calculated time involved to obtain an estimate, in view of the available computational resources available.

For example, trade lanes that have been calculated by the calculation efficiency engine 122 to contribute more to the revenue (e.g., trade lane between origin 202(1) and destination 222(1)) are calculated with more computational resources than those that are deemed to be in other categories (i.e., less significant), thereby providing a computing architecture that increases accuracy within a predetermined computational window.

As mentioned above, the calculation efficiency engine 122 is configured to estimate a revenue generated from each trade lane. Such estimates can be performed based on historical data, which can be retrieved from the historical database 110 or simply based on the mode of transportation, distance traveled, and volume (e.g., number of TEUSs). In this regard, reference now is made to FIG. 3, which is a graph 300 of the contribution of different trade lanes towards the total revenue, consistent with an illustrative embodiment. Aspects of FIG. 3 will be discussed with reference to the architecture of FIG. 1.

Figure 3:
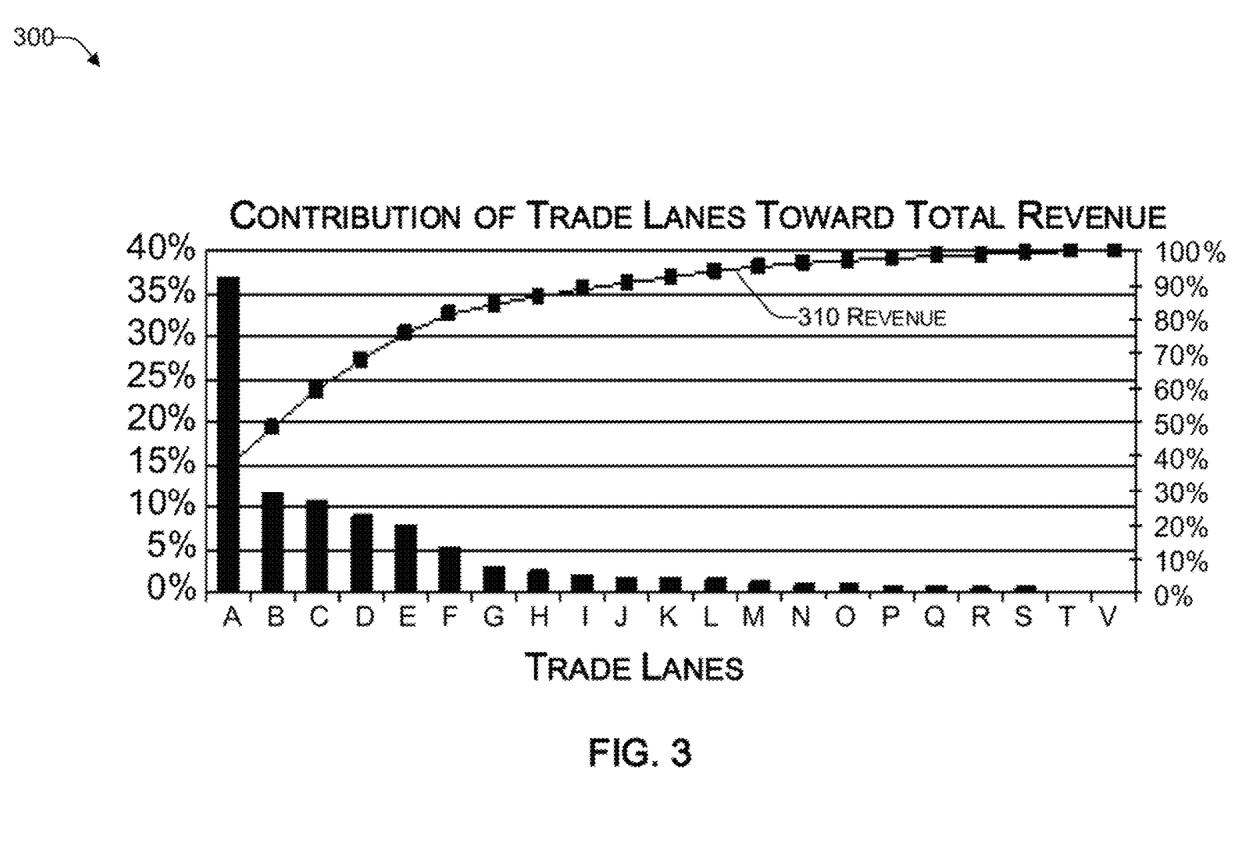
FIG. 3 is a graph of the contribution of different trade lanes towards the total revenue, consistent with an illustrative embodiment.

By way of example, an RFQ 117 received from a shipper computing device 118 may involve different trade lanes, represented by way of example by entries A to V, which have been listed in order of contribution toward a total revenue. For example, trade lane A may be 5000 TEUs from Shanghai, China to Felixstowe Port, UK; trade lane B may be 3000 TEUs from Shanghai, China to Dublin, Ireland; and so on. Trade lane A accounts for about 37% and trade lane B accounts for about 12% of the revenue generated for the forwarder, respectively. In the example of FIG. 3, 80% of the revenue is generated by the top 5 routes A to E. Thus, FIG. 3 lists each trade lane in an order based on how lucrative it is to the forwarder.

Figure 4A:
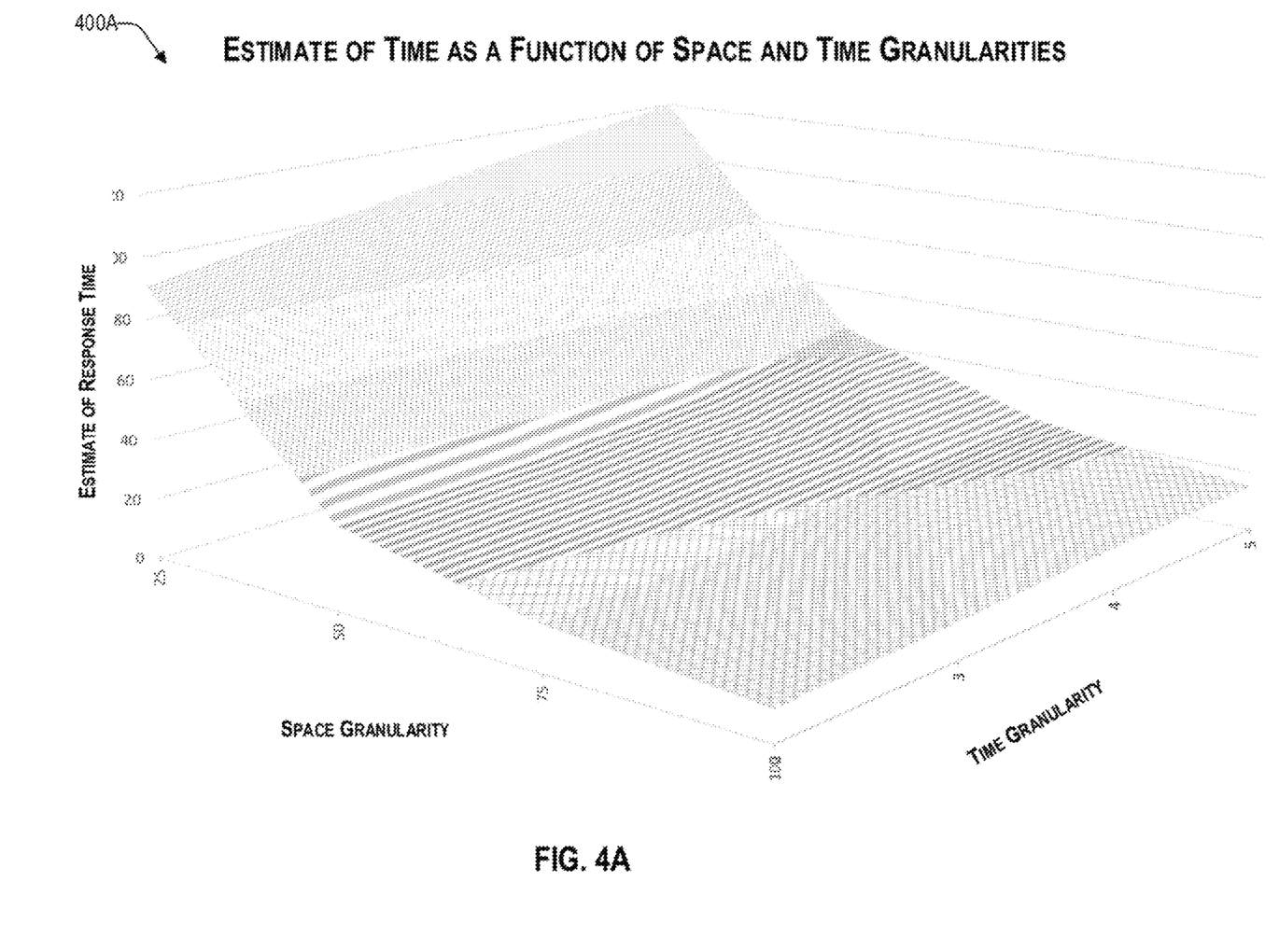
FIG. 4A illustrates an example graph of an estimate of the time it takes to perform a calculation of the transportation cost estimate for a particular trade lane as a function of space and time granularities, consistent with an exemplary embodiment.

Reference now is made to FIG. 4A, which illustrates an example graph 400A of an estimate of the time it takes to perform the calculation of the transportation cost estimate (e.g., simulation time) for a particular trade lane as a function of space and time granularities, consistent with an exemplary embodiment. For example, graph 400A can represent a particular trade lane, which can be relatively quickly generated by the calculation efficiency engine 122 based on historical data, which may be provided by the historical database 110. In the example of FIG. 4A, graph 400A provides an estimate of the time to estimate the cost of shipping 300 TEUs over a one-year period, as a function of the space granularity and time granularity.

The space granularity (i.e., granularity of shipment) ranges from 25 to 100 TEUs and the time granularity ranges from 2 to 5 periods, while it will be understood that other ranges may be considered as well by the calculation efficiency engine 122. It will be understood that the simulation time estimate is based on the computational resources available to the calculation efficiency engine 122. The surface of the graph in FIG. 4A shows that as the increment of TEUs that are considered possible to be shipped in each time period goes up (i.e., space granularity decreases), the simulation time estimate decreases. Further, as the number of periods goes up (i.e., time granularity increases), the simulation time estimate increases. Other shapes for the surface of the graph are possible.

Figure 4B:
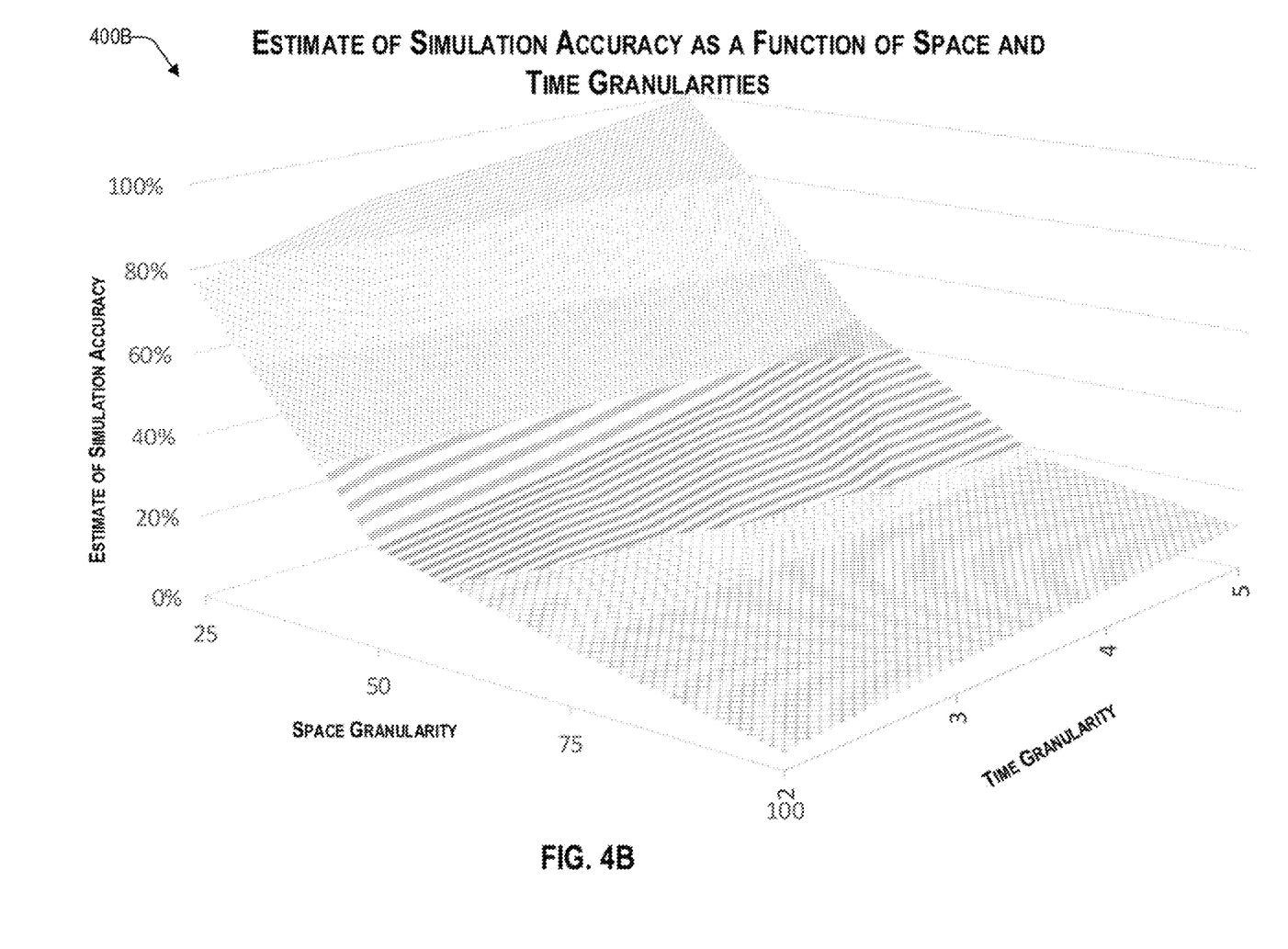
FIG. 4B is example graph of an estimate of accuracy of the cost estimate for a particular trade lane as a function of space and time granularities, consistent with an illustrative embodiment.

Reference now is made to FIG. 4B, which illustrates an example graph 400B of an estimate of accuracy of the cost estimate for a particular trade lane as a function of space and time granularities, consistent with an exemplary embodiment. For example, graph 400B can represent a particular trade lane, which can be relatively quickly generated by the calculation efficiency engine 122 based on historical data, which may be provided by the historical database 110. In the example of FIG. 4B, graph 400B provides an estimate of the accuracy of the cost estimate of shipping 300 TEUs over a one-year period, as a function of the space granularity and time granularity. The space granularity (i.e., granularity of shipment) ranges from 25 to 100 TEUs, and the time granularity ranges from 2 to 5 periods, while it will be understood that other ranges may be considered as well by the calculation efficiency engine 122. The surface of the graph in FIG. 4B shows that as the increment of TEUs that are considered possible to be shipped in each time period goes up (i.e., space granularity decreases), the accuracy estimate decreases. Further, as the number of periods goes up (i.e., time granularity increases), the accuracy estimate increases. Other shapes for the surface of the graph are possible.

In one embodiment, graphs 400A and 400B are generated for each trade lane by the calculation efficiency engine 122. Given a simulation time limit for a particular trade lane, the calculation efficiency engine 122 can use FIG. 4A and FIG. 4B generated for that trade lane and compute the space granularity and the time granularity that provide the best accuracy while keeping the estimated simulation time within the simulation time limit.

Figure 5A:
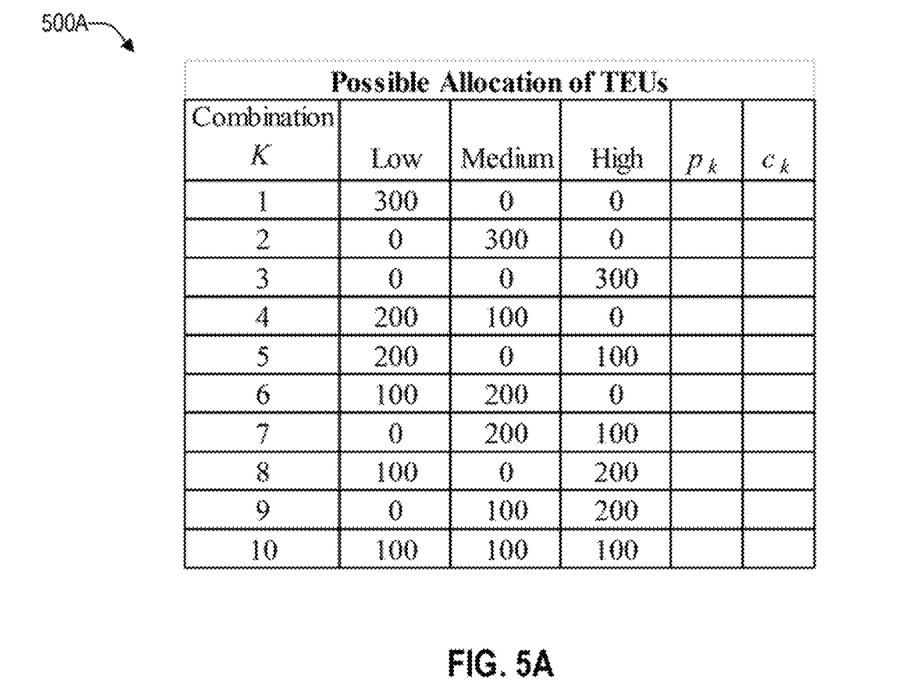
FIG. 5A illustrates an example table of all possible allocations of a predetermined number of twenty-foot equivalent units that can be shipped for specific space and time granularities.

With the foregoing overview of the architecture 100 and analysis of simulation time vs. granularity 400A and accuracy vs. granularity 400B, it may be helpful now to provide some mathematical examples of calculating transportation cost. By way of example, assume that the calculation efficiency engine is tasked to estimate the transportation cost for a particular trade lane for which forwarder would like to ship d=300 TEUs over one year. Also, assume that the time granularity is 3 periods. The first period may have three months and be characterized as having a low demand (e.g., "Low" period), the second period may have seven months and be characterized as having a medium demand (e.g., "Medium" period), and the third period may have two months and be characterized as having a high demand (e.g., "High" period). Further, assume that the space granularity is 100 TEUs. Given these time and space granularities, FIG. 5A illustrates an example table 500A of all possible allocations of the 300 TEUs that can be shipped for specific space and time granularities.

Each row in the table represents one possible way of shipping the 300 TEUs. For example, in the row for combination k=6, 100 TEUs are shipped in period Low, 200 TEUs are shipped in period Medium, and 0 TEUs are shipped in period High. Column $p_k$, k=1, ..., 10, represents the probability of combination k, and column $c_k$, k=1, ..., 10, represents the estimated cost of shipping the 300 TEUs according to combination k.

The calculation efficiency engine 122 assumes that $p_j$, j=Low, Medium, High, is the probability that one TEU is shipped in period j ($\Sigma p_j$=1). In one embodiment, these probabilities are calculated from historical data. For example, assuming that $p_{low}$=10%, $p_{medium}$=70%, $p_{high}$=20%. The calculation efficiency engine 122 assumes that $d_j$, j=Low, Medium, High, is the number of TEUs in a particular row of table 500A ($\Sigma d_j$=d). For example, for combination k=6, $d_{low}$=100, $d_{medium}$=200, $d_{high}$=0, and d=100+200+0=300. The probability of combination k can be computed by equation 1 below:

$$p_k = \frac{d!}{d_{low}! d_{medium}! d_{high}!} p_{low}^{d_{low}} p_{medium}^{d_{medium}} p_{high}^{d_{high}} \quad \text{(Eq. 1)}$$

More generally, the probability of combination k is provided by the expression below:

$$p_k = \frac{d!}{d_1! \ldots d_j!} p_1^{d_1} \ldots p_j^{d_j} \quad \text{(Eq. 2)}$$

For example, for combination k=6, $$p_6 = \frac{300!}{100! \, 200! \, 0!} 0.1^{100} 0.7^{200} 0.2^0 = 4.5\%.$$

By way of example, assume that there are four carriers (e.g., A, B, C, and D) serving a trade lane. The maximum percentage of demand in a period that can be allocated to a carrier i, from carriers A, B, C, and D for a trade lane is provided by the expression of equation 3 below:

$$m_i, i=A, \ldots, D \quad \text{(Eq. 3)}$$

By way of example, let $m_A$=30%, $m_B$=30%, $m_C$=50%, $m_D$=60%. For each row (i.e., combination k) of the table 500A of FIG. 5A, the calculation efficiency engine 122 can allocate the TEUs among the four carriers A to D.

Figure 5B:
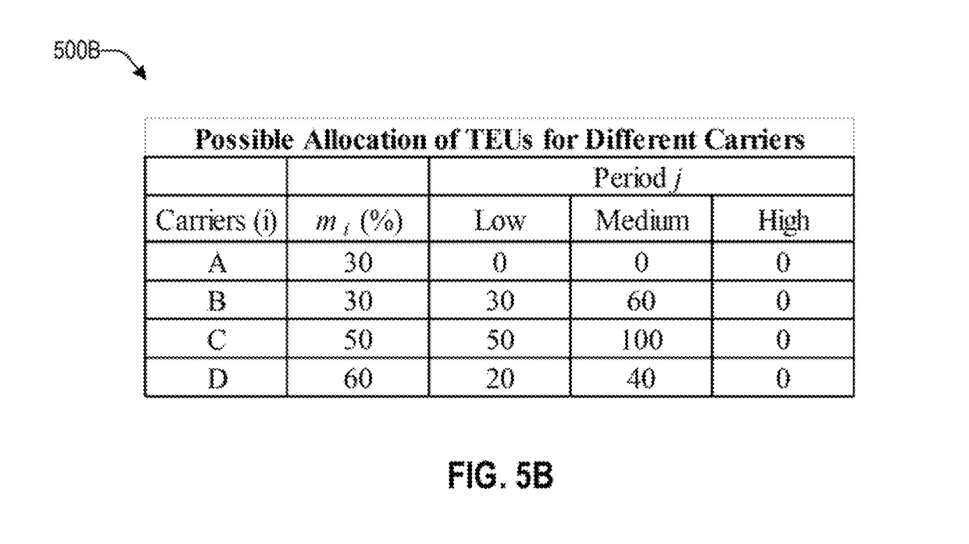
FIG. 5B illustrates an example table of possible allocation of twenty-foot equivalent units among four carriers for predetermined periods.

In this regard, FIG. 5B illustrates an example table of possible allocation of TEUs for different carriers (i.e., A to D) for combination k=6, for which $d_{low}$=100, $d_{medium}$=200, $d_{high}=0$. One way to allocate each $d_j$ among the available carriers A to D is to allocate the maximum allowed to the most cost-effective carrier, then allocate the maximum allowed to the second most cost-effective carrier, and repeat the process until the total value of $d_j$ has been allocated. Another way is to formulate and solve an optimization problem, which could be based on minimizing cost, minimizing risk, or a combination of both, and which can be formulated in such a way as to take into account important business rules such as those mentioned earlier. In either of these two approaches, the calculation efficiency engine 122 estimates the transportation cost per TEU for each carrier i and for each period j, which can be denoted as $\bar{c}_{ij}$. In various embodiments, such data can be obtained from historical data or by requesting the cost data from the carriers.

Upon allocating each $d_j$ among the available carriers for each combination k the calculation efficiency engine 112 can compute the cost for that combination k. Accordingly, column $c_k$ in FIG. 5A can be completed. Assuming that $x_{ij}$ represents the amount allocated to carrier i in period j, the cost $c_k$ is calculated by the expression below:

$$c_k = \Sigma_i \Sigma_j \bar{c}_{ij} x_{ij} \quad \text{(Eq. 4)}$$

Finally, the calculation efficiency engine 112 can compute the expected value of the total cost for that trade lane by the expression below:

$$E[\text{Cost}] = \Sigma_k p_k c_k \quad \text{(Eq. 5)}$$

Where $p_k$ is the probability of combination k and $c_k$ is the total cost of combination k.

Figure 6:
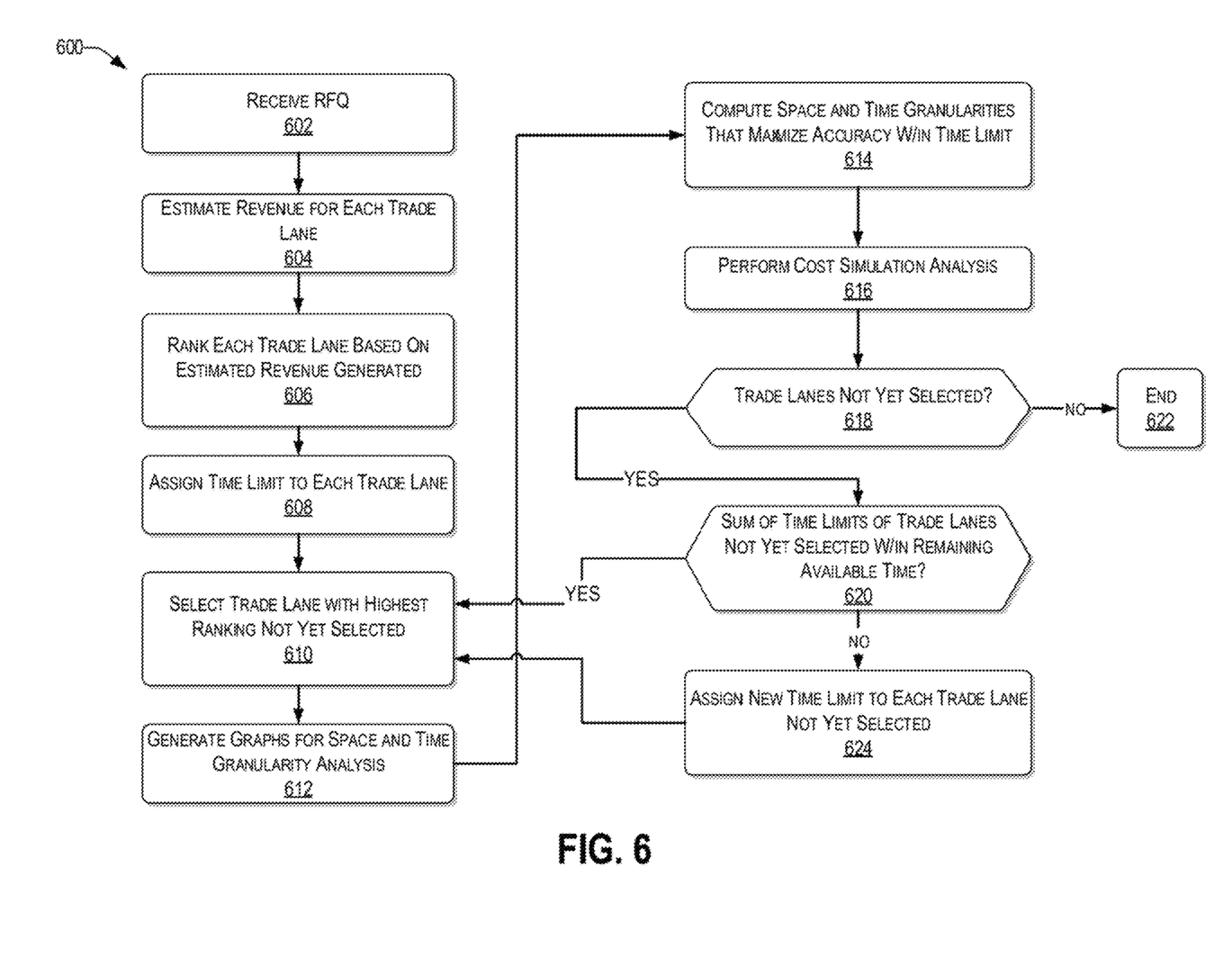
FIG. 6 presents an illustrative process for a calculation of transportation cost in the context of a response to a request for a quote.

With the foregoing overview of the architecture 100, discussion of parameters considered by the calculation efficiency engine 122 for each trade lane, and discussion of granularity, it may be helpful now to consider a high-level discussion of an example call flow process. To that end, FIG. 6 presents an illustrative process 600 for the calculation of transportation cost in the context of a response to an RFQ.

Process 600 is illustrated as a collection of blocks in a process, representing a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process. For discussion purposes, the process 600 is described with reference to the architecture 100 of FIG. 1.

At block 602, the calculation efficiency engine 122 (representing the forwarder) receives a request for an RFQ from a shipper. The RFQ typically has a response deadline. At block 604, the calculation efficiency engine 122 estimates the revenue that could be generated for the forwarder for each trade lane. The revenue generated may be based on a number of TEUs associated with the trade lane (i.e., volume) and/or distance traveled for the trade lane.

At block 606, each trade lane is ranked based on the estimated revenue generated. For example, trade lanes that are more lucrative to the forwarder are ranked higher. At block 608, each trade lane is assigned a time limit that will be used to constrain the time it takes to simulate the cost for the trade lane. In general, trade lanes of high ranking will be assigned larger time limits than trade lanes of low ranking. For example, the largest time limit could be assigned to the trade lane of highest ranking, the second largest time limit could be assigned to the second highest ranking trade lane, etc.

In one embodiment, a first (e.g., large) time limit is assigned to each of the trade lanes with highest ranking that account for a predetermined percentage of the revenues (e.g., 70% of the revenues) and a second (e.g., smaller) time limit is assigned to each of the remaining trade lanes. Whatever the method used to assign a time limit to each trade lane, the sum of all time limits must lie within the available time to respond to the RFQ.

At block 610, the trade lane with a highest ranking, for which cost has not yet been estimated, is selected. At block 612, the graphs for space and time granularity analysis of the trade lane selected are generated.

At block 614, the space and time granularities for the trade lane selected are determined such that the accuracy of the simulation is maximized and the estimated time for the simulation falls within the time limit for that trade lane. The computation of the space and time granularities is based on the graphs generated at block 612.

At block 616, a cost simulation is performed based on the identified space and time granularities. If, upon completing the cost simulation for the selected trade lane all trade lanes have been selected (i.e., "NO" at decision block 618) the process ends at block 622. However, upon the calculation efficiency engine 122 determining that there are still trade lanes that have not been selected (i.e., "YES" at decision block 618), the process continues with decision block 620.

At decision block 620, the calculation efficiency engine 122 determines how much time remains (i.e., between the completion of the simulation of the selected trade lanes and the time limit). If the sum of the time limits for the trade lanes not yet selected is within the remaining time (i.e., "YES" at decision block 620), the process returns to block 610 in order to select another trade lane. However, if the sum of the time limits for the trade lanes not yet selected in not within the remaining time (i.e., "NO" at decision block 620), new time limits are assigned to each trade lane not yet selected at block 624. Block 624 is similar to block 608 except that only the trade lanes not yet selected (i.e., trade lanes for which the simulation of the cost has not yet been performed) are considered. In addition, the sum of the new time limits for the trade lanes not yet selected must fall within the remaining time available to respond to the RFQ.

In one embodiment, the final simulation results are then presented on a display of the forwarder computing device 120 by the calculation efficiency engine 122, such that an RFQ can be created by the forwarder computing device 120 and or a user thereof.

Figure 7:
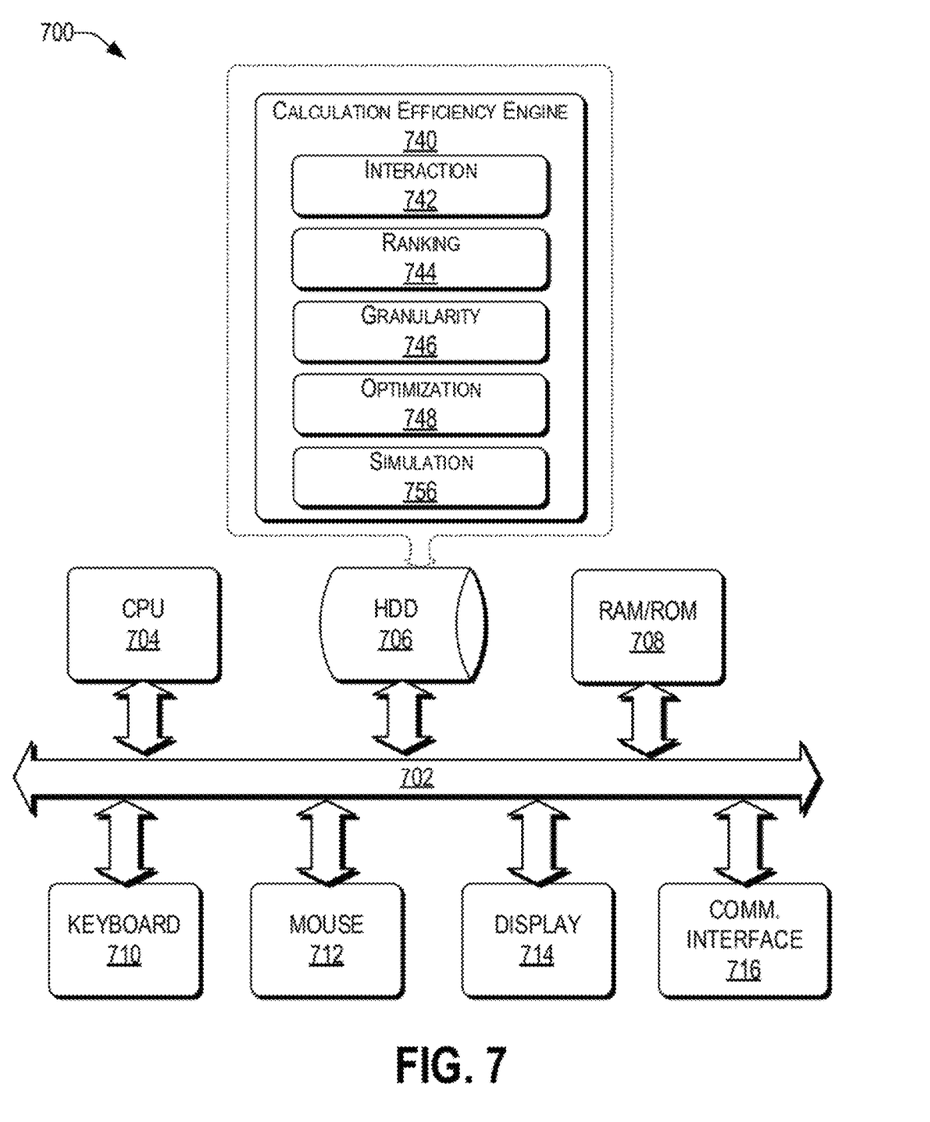
FIG. 7 is a functional block diagram illustration of a computer hardware that can communicate with various networked components.

As discussed above, functions relating to simulating shipping cost in the context of an RFQ having multiple trade lanes can be performed with the use of one or more computing devices connected for data communication via wireless or wired communication, as shown in FIG. 1. FIG. 7 is a functional block diagram illustration of a computer hardware platform such as the forwarder computing device 120 of FIG. 1 that can communicate with various networked components, such as the historical database 110, carrier database 112, shipper computing device 118, etc.

The computer platform 700 may include a central processing unit (CPU) 704, a hard disk drive (HDD) 706, random access memory (RAM) and/or read only memory (ROM) 708, a keyboard 710, a mouse 712, a display 714, and a communication interface 716, which are connected to a system bus 702.

In one embodiment, the HDD 706, has capabilities that include storing a program that can execute various processes, such as the calculation efficiency engine 740, in a manner described herein. The calculation efficiency engine 740 may have various modules configured to perform different functions.

In one embodiment, there may be an interaction module 742 that is operative to interact with carriers 102, carrier databases 112, historical databases 110, shipper computing devices, etc.

In one embodiment, there is a ranking module 744 that is operative to rank trade lanes in the RFQ based on their contribution to the total revenue for the forwarder. There may be a granularity module 746 that is operative to perform space and time granularity analysis for different trade lanes.

In one embodiment, there is an optimization module 748 that is operative to identify carrier allocation for each trade lane in the RFQ.

In one embodiment, there is a simulation module 756 that is operative to calculate a prospective transportation cost for different trade lanes in the RFQ based on the granularities identified in the granularity module 746.

In one embodiment, a program, such as Apache™, can be stored for operating the system as a Web server. In one embodiment, the HDD 706 can store an executing application that includes one or more library software modules, such as those for the Java™ Runtime Environment program for realizing a JVM (Java™ virtual machine).

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device for content and programming coupled to the processor;
   a calculation engine software stored in the storage device, wherein an execution of the calculation engine by the processor configures the computing device to perform acts comprising:
      receiving a request for quote (RFQ) from a shipper having a plurality of trade lanes;
      estimating a revenue generated from each trade lane;
      ranking each trade lane based on the estimated revenue generated;
      assigning an original time limit to each trade lane;
      selecting a trade lane with a highest ranking that has not yet been selected;
      for the selected trade lane:
         generating graphs for space and time granularity analysis;
         calculating space and time granularities that maximize accuracy within the assigned time limit based on the generated graphs; and
         performing cost simulation analysis using the calculated space and time granularities where trade lanes that have a different ranking are simulated with different granularity of shipment and time granularity based on the calculated space and time granularities, thereby better allocating the computing resources of the computing device;
      upon determining that there are trade lanes not yet selected, returning to the act of selecting a trade lane; and
      displaying results of the cost simulation analysis of each trade lane of the plurality of trade lanes on a display of the user device.

2. The computing device of claim 1, wherein execution of the calculation engine further configures the computing device to perform acts comprising, upon determining that there are trade lanes not yet selected and before returning to the act of selecting a trade lane:
   calculating a remaining available time; and
   upon determining that a sum of time limits of trade lanes not yet selected, of the plurality of trade lanes, is not within the remaining available time, assigning a new time limit to each trade lane not yet selected.

3. The computing device of claim 2, wherein, for each trade lane, the assigned new time limit is shorter than the originally assigned time limit.

4. The computing device of claim 1, wherein the assigned original time limit is progressively less for each lower ranked trade lane.

5. The computing device of claim 1, wherein estimating the revenue for a trade lane is based on a volume of shipment and a distance between an origin and a destination for the trade lane.

6. The computing device of claim 1, wherein trade lanes that are selected earlier generate more revenue than trade lanes that are selected later.

7. The computing device of claim 1, wherein generating graphs for space and time granularity analysis comprises determining computing resources available.

8. The computing device of claim 1, wherein estimating the revenue generated from each trade lane is based on historical information retrieved from a historical database.

9. A non-transitory computer readable storage medium tangibly embodying a computer readable program code having computer readable instructions that, when executed, causes a computing device to carry out a method of simulating a cost of shipment, the method comprising:
   receiving a request for quote (RFQ) from a shipper having a plurality of trade lanes;
   estimating a revenue generated from each trade lane;
   ranking each trade lane based on the estimated revenue generated;
   assigning an original time limit to each trade lane;
   selecting a trade lane with a highest ranking that has not yet been selected;
   for the selected trade lane:
      generating graphs for space and time granularity analysis;
      calculating space and time granularities that maximize accuracy within the assigned time limit based on the generated graphs; and
      performing cost simulation analysis using the calculated space and time granularities where trade lanes that have a different ranking are simulated with different granularity of shipment and time granularity based on the calculated space and time granularities, thereby better allocating the computing resources of the computing device;
   upon determining that there are trade lanes not yet selected, returning to the act of selecting a trade lane; and displaying results of the cost simulation analysis of each trade lane of the plurality of trade lanes on a display of the user device.

10. The non-transitory computer readable storage medium of claim 9, further comprising, upon determining that there are trade lanes not yet selected and before returning to the act of selecting a trade lane:
calculating a remaining available time; and
upon determining that a sum of time limits of trade lanes not yet selected, of the plurality of trade lanes, is not within the remaining available time, assigning a new time limit to each trade lane not yet selected.

11. The non-transitory computer readable storage medium of claim 10, wherein, for each trade lane, the assigned new time limit is shorter than the originally assigned time limit.

12. The non-transitory computer readable storage medium of claim 9, wherein the assigned original time limit is progressively less for each lower ranked trade lane.

13. The non-transitory computer readable storage medium of claim 9, wherein estimating the revenue for a trade lane is based on a volume of shipment and a distance between an origin and a destination for the trade lane.

14. The non-transitory computer readable storage medium of claim 9, wherein trade lanes that are selected earlier generate more revenue than trade lanes that are selected later.

15. The non-transitory computer readable storage medium of claim 9, wherein generating graphs for space and time granularity analysis comprises determining computing resources available.

16. The non-transitory computer readable storage medium of claim 9, wherein estimating the revenue generated from each trade lane is based on historical information retrieved from a historical database.

17. A computer implemented method comprising:
receiving, by a computing device, a request for quote (RFQ) from a shipper having a plurality of trade lanes;
estimating, by the computing device, a revenue generated from each trade lane;
ranking, by the computing device, each trade lane based on the estimated revenue generated;
assigning, by the computing device, an original time limit to each trade lane;
selecting, by the computing device, a trade lane with a highest ranking that has not yet been selected;
for the selected trade lane:
generating graphs, by the computing device, for space and time granularity analysis;
calculating, by the computing device, space and time granularities that maximize accuracy within the assigned time limit based on the generated graphs; and
performing, by the computing device, cost simulation analysis using the calculated space and time granularities where trade lanes that have a different ranking are simulated with different granularity of shipment and time granularity based on the calculated space and time granularities, thereby better allocating the computing resources of the computing device;
upon determining that there are trade lanes not yet selected, returning to the act of selecting a trade lane; and
displaying results of the cost simulation analysis of each trade lane of the plurality of trade lanes on a display of a user device.

18. The computer implemented method of claim 17, further comprising, upon determining that there are trade lanes not yet selected and before returning to the act of selecting a trade lane:
calculating a remaining available time; and
upon determining that a sum of time limits of trade lanes not yet selected, of the plurality of trade lanes, is not within the remaining available time, assigning a new time limit to each trade lane not yet selected.

* * * * *